Jan. 20, 1959 K. M. ELLIOTT 2,870,083
HIGH PRESSURE REFORMING WITH LOWERED HYDROGEN PARTIAL PRESSURE
Filed Nov. 9, 1953 7 Sheets-Sheet 1
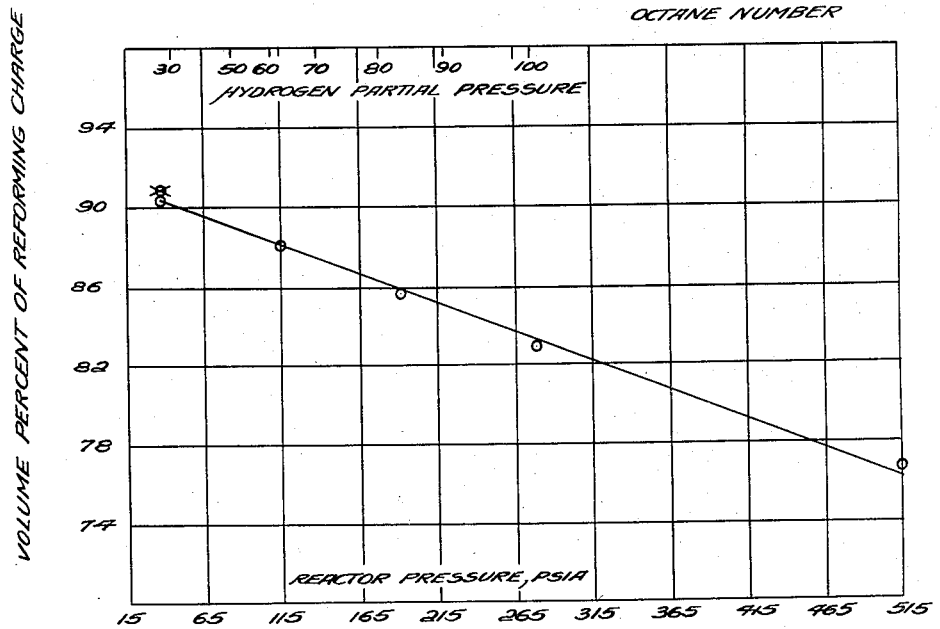
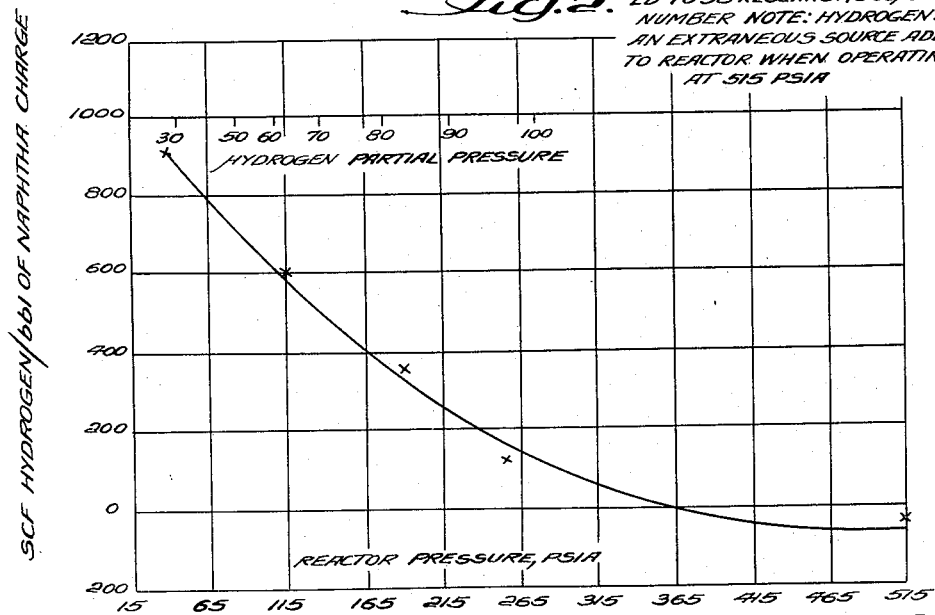
INVENTOR
Kenneth M. Elliott
BY Francis F. Johnston
AGENT

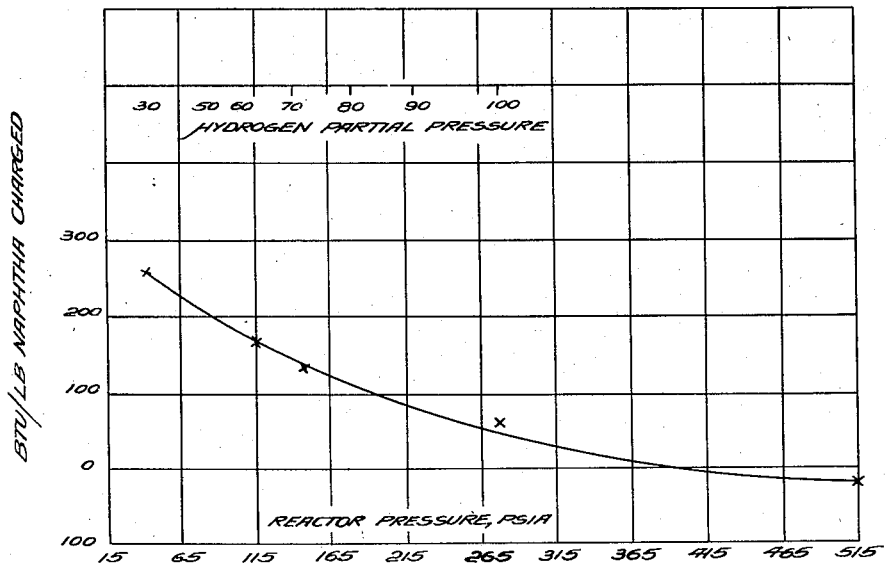
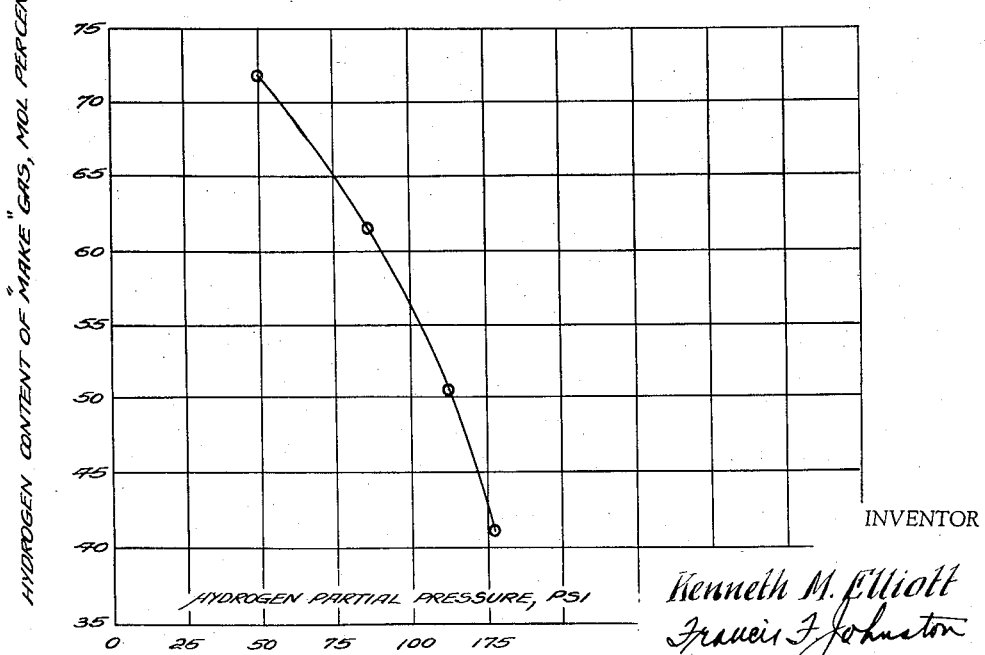

INVENTOR
Kenneth M. Elliott
BY Francis J. Johnston
AGENT

INVENTOR
Kenneth M. Elliott
BY Francis F. Johnston
AGENT

INVENTOR
Kenneth M. Elliott
BY Francis F. Johnston
AGENT

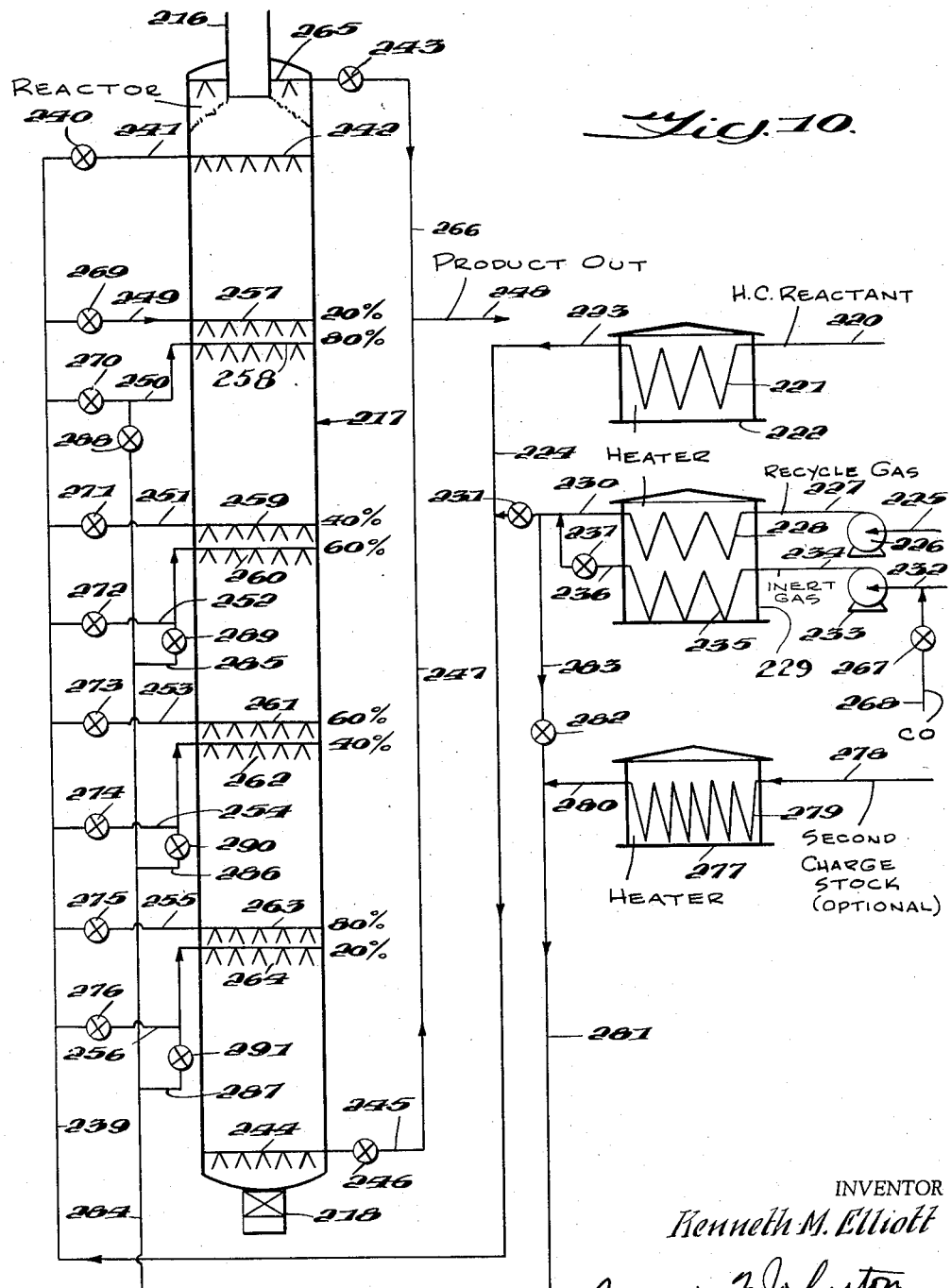

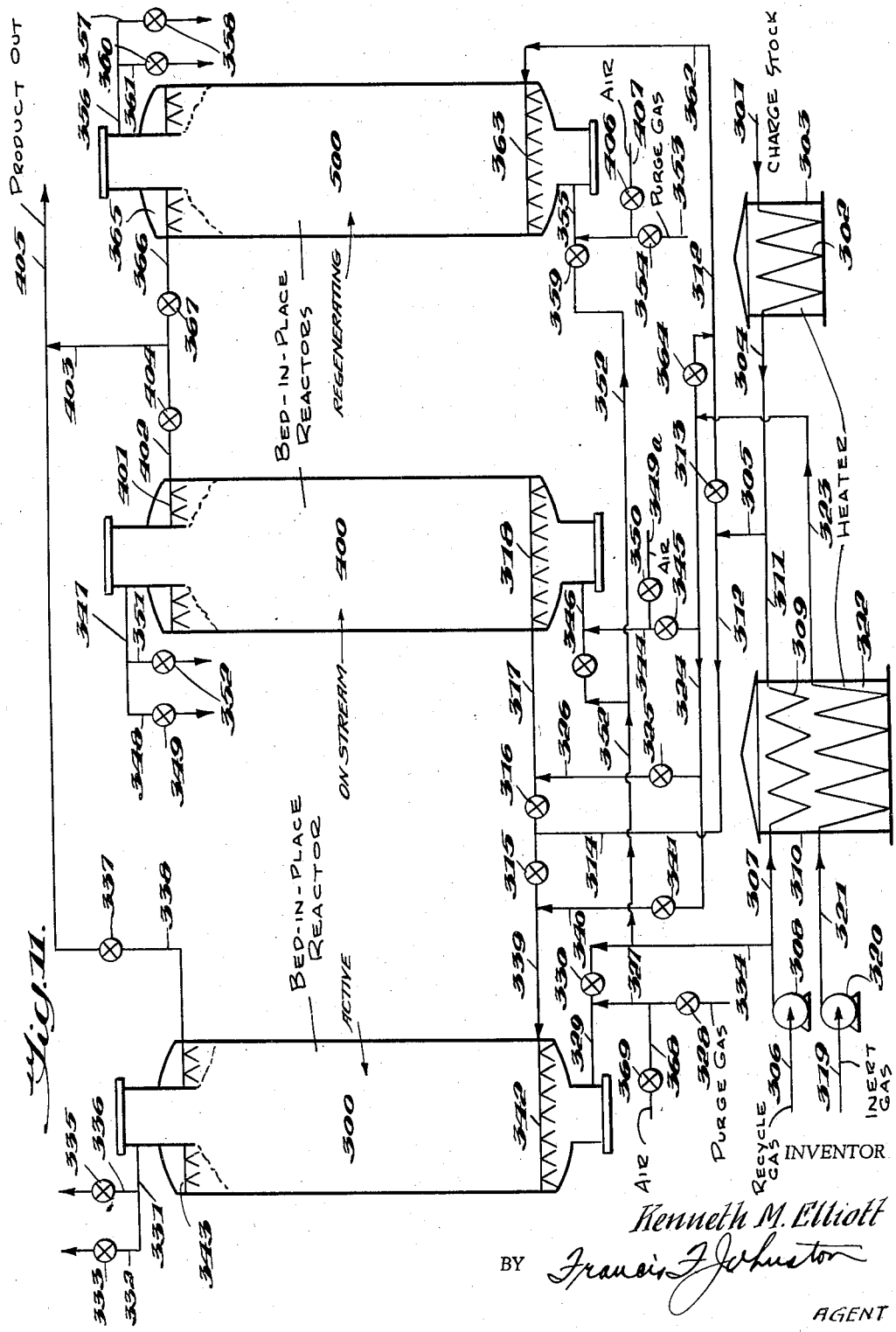

United States Patent Office 2,870,083
Patented Jan. 20, 1959

2,870,083

HIGH PRESSURE REFORMING WITH LOWERED HYDROGEN PARTIAL PRESSURE

Kenneth M. Elliott, Woodbury, N. J., assignor to Socony Mobil Oil Company, Inc., a corporation of New York Application November 9, 1953, Serial No. 391,095

5 Claims. (Cl. 208—135)

The present invention relates to the reforming of hydrocarbons and, more particularly, to a method of reforming hydrocarbons at relatively high pressures whereby the advantages of reforming at relatively low pressures are obtained.

Reforming, as the word is most commonly used, is that hydrocarbon conversion in which a petroleum fraction is treated to improve or raise the anti-knock rating thereof. Reforming includes one or more or all of the molecular changes of hydrocarbons which are designated: "isomerization," "dehydrogenation," "hydrogenation" and "dehydrocyclization" or "aromatization." Reforming taking place in the absence of catalysts at elevated temperatures greater than about 1100° F. is known as thermal reforming, while reforming taking place in the presence of catalysts at temperatures of about 800° to about 1080° F. is known as catalytic reforming.

Catalytic reforming can take place in the presence or absence of hydrogen or a hydrogen containing gas at pressures from atmospheric to super-atmospheric pressures of the order of 600 pounds per square inch absolute (p. s. i. a.) for group VI catalysts and of the order of 100 to about 1500 p. s. i. a. for group VIII catalysts. Since the petroleum fraction to be reformed represents a portion of the crude treated, every effort is made to convert the total feed to reformate of higher octane rating. However, the greater the incremental increase in octane rating necessary to produce a reformate of required increased octane rating, the greater the severity of conditions necessary, and generally the lower the recovery of reformate. The same incremental increase in anti-knock rating can be obtained at various reactor pressures, 40 p. s. i. a. to 500 p. s. i. a., but the yield of 10 pound Reid vapor pressure (10 R. V. P.) reformate of given octane rating normally decreases as the reactor pressure is increased. This is graphically depicted in Figure 1 wherein the volume percent yield of 10 R. V. P. reformate having a 98 Research (3 cc.) octane number from a virgin naphtha having a boiling range of 210° to 380° F., produced in the presence of a group VI catalyst, is plotted against the reactor pressure. The data presented in Figure 1 clearly indicate that from the standpoint of yield, optimum results are obtained at low reactor pressures. The desirability of operating at low reactor pressures is further demonstrated by the data graphically presented in Figure 2 wherein the effect of reactor operating pressure on the production of hydrogen in reforming the same petroleum fraction having a boiling range of 210° to 380° F., in the presence of a group VI catalyst, to a reformate having 98 Research (3 cc.) octane number is illustrated. Again, it is manifest that maximum production of hydrogen occurs at low reactor pressures. Thus, the data presented in Figures 1 and 2 indicate that optimum conversion conditions exist at low reactor pressures. However, from a practical standpoint low reactor pressures are not desirable because of the increased demand for heat energy at low pressures compared with that demand at high reactor pressures. That is to say, the heat required for the reaction is greater at low reactor pressures than at high reactor pressures. Data establishing that the heat required for the reaction, in the presence of a group VI catalyst, is greater at low reactor pressures than at high reactor pressures is plotted in Figure 3. In other words, while the data presented in Figures 1 and 2 establish that better technical results are obtained at low reactor pressures, the heat requirement is such that commercially it is not attractive to operate at low reactor pressures.

One of the disadvantages of operating at low reactor pressures rather than at high reactor pressures when reforming in the presence of recycle gas is that at the same recycle gas to naphtha mol ratio, the reactor for conversion at low pressures of the order of 65 p. s. i. a. must have a reaction zone with a cross-sectional area about 4 times that of a reactor operating at 415 p. s. i. a. In other words, a reforming unit to operate at reactor pressures of 200 to 400 p. s. i. a. is cheaper to build and operate than one designed to operate at reactor pressures of 40 to 100 p. s. i. a. because: (1) at high reactor pressures the flowing volume of recycle gas is much less than at low reactor pressures; (this reduces the size and energy requirements for the recycle gas pump. In addition, the size of the pipes through which the gas flows can be reduced. This is important because the cost of piping normally is about 25 percent of the total unit cost). (2) The area required to disengage vapors and catalyst is reduced by increasing the operating pressure; (consequently, a reactor of smaller diameter can be used when operating at high reactor pressures); and (3) the removal of reformed gasoline from gaseous products is greatly facilitated at high operating pressures. Thus, the cost of the gas recovery portion of the unit becomes less as the operating pressure is increased. In addition to the foregoing advantages, concomitant with the use of high operating pressures, is the disadvantage attendant upon supplying the high endothermic heat of reaction at low operating pressures. In Figure 3, illustrating the effect of operating pressure on the heat of reaction, it is shown that the required heat or B. t. u. per pound of naphtha charged, is 260 B. t. u. per pound at 40 p. s. i. a. while at 175 p. s. i. a. the heat required is but about 105 B. t. u. per pound of naphtha charged.

While it would appear that supplying this extra heat energy would not be insurmountable, several methods of doing so have been considered and found to be unsatisfactory for various reasons. Thus, indirect heat transfer from heat exchange medium flowing through tubes located in the reactor is characterized by high initial investment and potentially high maintenance costs. Reheating of reactor effluent recycle in a reheat furnace leads to intolerable loss in gasoline yield. Circulation of hot catalyst at a high rate leads to catalyst loss. Thus, there is a problem of obtaining the advantages of operating at low reactor pressures while also retaining the advantages of operating at high reactor pressures.

It now has been discovered that the advantages of low operating pressure reforming can be obtained while retaining the advantages of high operating pressure reforming by controlling the hydrogen partial pressure in the reactor. In general, in accordance with the principles of the present invention, hydrocarbon reactant is reformed at high operating or reactor pressures at comparatively low hydrogen partial pressures and at customary catalytic reforming temperatures. Accordingly, it is an object of the present invention to provide a method of reforming a hydrocarbon reactant in the presence of a particle form solid reforming catalyst either as a bed in place, in fluidized form, or as a moving substantially compact column of catalyst whereby the advantages of reforming at low reactor or operating pressures are obtained while retaining the advantages of reforming at high reactor or operating pressures. It is another object of the present invention to provide a method of reforming a hydrocarbon reactant in the presence of a particle form solid reforming catalyst at high reactor or operating pressures while the partial pressure of hydrogen in the reactor is relatively low. It is a further object of the present invention to provide a method of reforming a hydrocarbon reactant in the presence of a particle form solid reforming catalyst and of a hydrogen-containing gaseous heat carrier with a net production of hydrogen under reforming conditions of temperature and pressure whilst maintaining a hydrogen partial pressure less than that equivalent to the hydrogen content of the gaseous heat carrier. The present invention has as a still further object to provide a method of reforming a hydrocarbon reactant in the presence of particle form solid reforming catalyst, and of a hydrogen containing gaseous heat carrier with net production of hydrogen at relatively high reactor or operating pressures wherein the hydrogen partial pressure is maintained below that equivalent to the hydrogen content of the gaseous heat carrier by admixing a fluid inert to the reforming conditions with the aforesaid gaseous heat carrier in amounts sufficient to provide a hydrogen partial pressure in the reactor or reaction zone less than that produced at the reactor pressure in the absence of said inert fluid. Other objects and advantages will become apparent to those skilled in the art from the following discussion taken in conjunction with the drawings in which Figure 4 is a graph showing the relation between the hydrogen content of the "make" gas and the hydrogen partial pressure for a reforming reaction in the presence of a group VI catalyst; Figure 5 is a graph showing the relation between the yield of 10 R. V. P. gasoline of given octane rating produced in the presence of a group VI catalyst and the hydrogen partial pressure;

Figure 10 is a schematic flow sheet illustrating another means of reforming a hydrocarbon reactant in the presence of a moving substantially compact column of particle form solid reforming catalyst in accordance with the principles of the present invention, and;

Figure 11 is a schematic flow sheet illustrating a means of reforming a hydrocarbon reactant in the presence of a stationary bed of particle-form solid reforming catalyst in accordance with the principles of the present invention.

Figure 5:
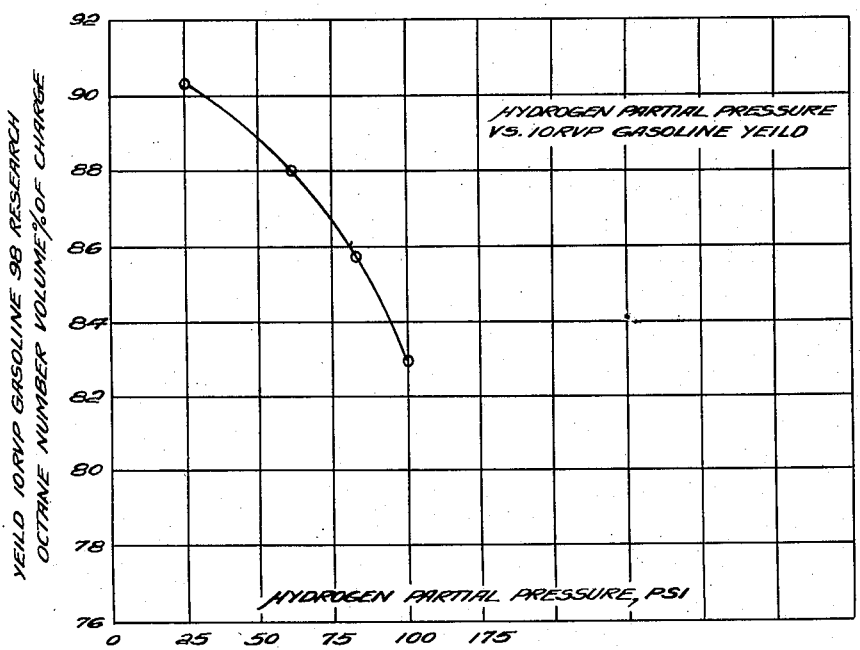
Figure 6:
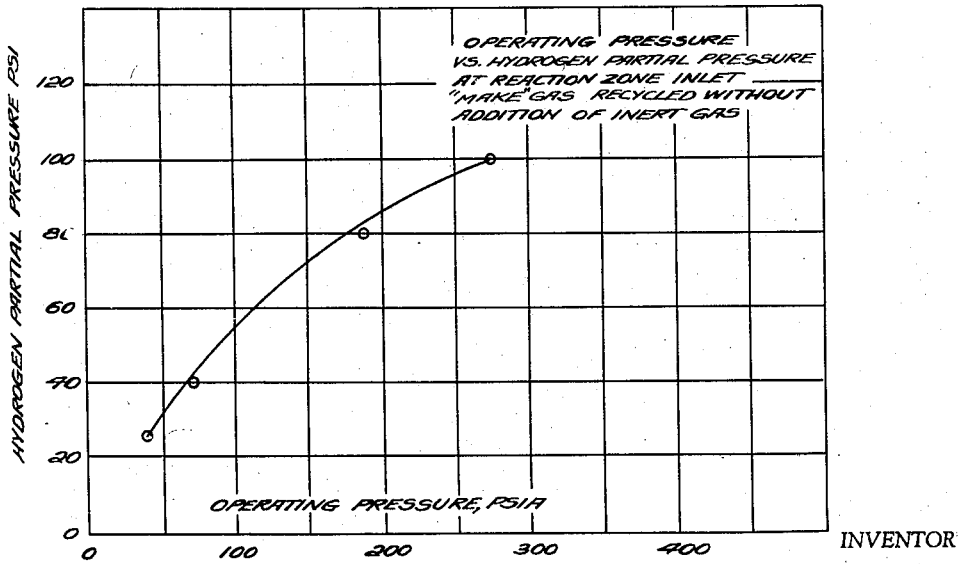
Figure 6 is a graph showing the relation between the operating or total pressure and the hydrogen partial pressure at the vapor inlet to the reaction zone containing a group VI catalyst with recycle of the make gas at a ratio of 6 mols per mol of hydrocarbon reactant.
Figure 7:
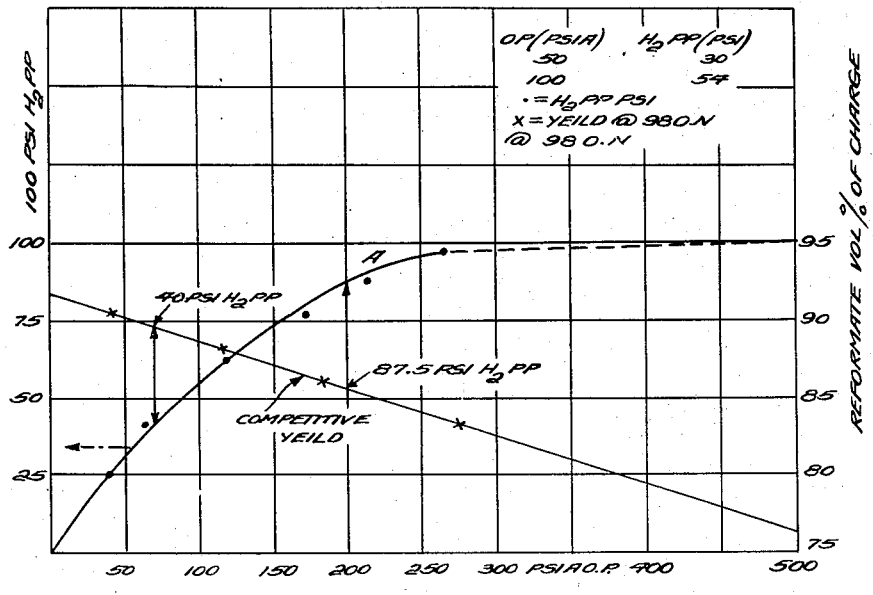
Figure 7 is a graph showing the relation between reactor pressure and yield of 98 O. N. reformate produced over a group VI catalyst and the relation of reactor pressure to hydrogen partial pressure in the absence of added inert fluid.
Figure 8:
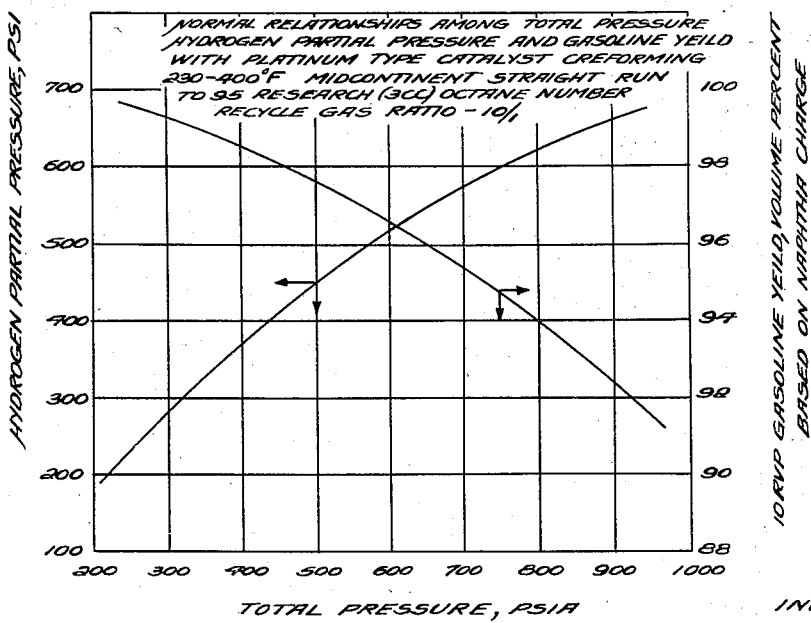
Figure 8 is a graph showing the relation between reactor pressure and yield of 95 O. N. reformate produced over a group VIII catalyst and the relation of reactor pressure to hydrogen partial pressure in the absence of added inert fluid.

By referring to Figure 4, it will be manifest that the lower the partial pressure of hydrogen, the higher the concentration of hydrogen in the "make" gas. Figure 5 establishes that the lower the hydrogen partial pressure, the higher the yield of 10 R. V. P. gasoline of given octane rating. Finally, study of Figure 6 makes one aware that when the "make" gas is recycled without the addition of inert gas, the hydrogen partial pressure increases as the operating pressure increases. Accordingly, optimum reforming results are obtained when operating at the highest total pressure commensurate with costs while maintaining the lowest hydrogen partial pressure.

It is well known that the most generally used solid reforming catalysts can be divided roughly into those which comprise composites of an oxide of a metal of the left column of group VI of the periodic table either with alumina or silica or alumina and silica, and those which comprise composites of an oxide of a metal of group VIII of the periodic table either with alumina or silica or alumina and silica. While the basic catalyst compositions are given hereinbefore, it is also well-known that other metals and/or oxides can be incorporated with the basic constituents of the catalyst. Thus, for example, it is well known to incorporate one or more of the metals: copper, iron, cobalt and nickel in platinum catalysts; it is also known to use platinum-alumina or silica and combined halogen as a catalyst. Furthermore, the chromia-alumina reforming catalysts have been modified by incorporation in the catalyst of copper, tin and antimony. Accordingly, the present invention, not being directed to catalyst composition, is directed to the use of particle-form solid reforming catalysts selected from the group consisting of (first class) composites comprising a metal oxide of the metals in the left column of group VI of the periodic table and at least one of alumina and silica with/or without modifying elements such as copper, tin, antimony, etc., and (second class) composites comprising an oxide of a metal of group VIII of the periodic table with at least one of alumina and silica with or without modifying elements such as copper, iron, cobalt and nickel. These modifying metals being used in conjunction with catalysts comprising one of the platinum group metals and alumina or silica. In other words, as used herein and in the claims, "(first class) composites comprising a metal oxide of the metals of the left column of group VI of the periodic table with at least one of alumina and silica" include reforming catalysts comprising not only the metal oxide and alumina and/or silica but also the metal oxide and alumina and/or silica with modifying materials as composites of the first class. Similarly, "(second class) composites comprising an oxide of a metal of group VIII of the periodic table with at least one of alumina and silica" include reforming catalysts comprising the oxide of the group VIII metal and alumina and/or silica with or without modifying materials as composites of the second class. In general, however, the following operating conditions for composites of the first class are satisfactory.

| | Broad | Preferred |
|---|---|---|
| Vapor Inlet Temp., °F | 900–1,080 | 1,000–1,060 |
| Vapor Outlet Temp., °F | 850–1,050 | 900–980 |
| Operating Pressure, p. s. i. a | 40–600 | 100–300 |
| Hydrogen Partial Pressure, p. s. i | 15–80 | 25–60 |
| Recycle Ratio: Mol Recycle Gas/Mol Hydrocarbon Reactant | 1–15 | 4–10 |
| Hydrogen Content of Recycle Gas, Mol percent | 10–45 | 20–30 |
| Inert Gas addition, Cubic feet/Bbl. naphtha charged | 300–5,000 | 500–2,500 |
| Space Velocity, Vol. Hydrocarbon reactant/hr./volume catalyst | 0.1–4.0 | 0.5–2.0 |

For composites of the second class such as the platinum-alumina and/or silica types, the following operating conditions are satisfactory.

| | Broad | Preferred |
|---|---|---|
| Vapor Inlet Temp., °F | 800–1,050 | 850–1,000 |
| Operating Pressure, p. s. i. a | 200–1,200 | 300–1,000 |
| Hydrogen Partial Pressure, p. s. i | 150–650 | 200–500 |
| Recycle Ratio: | | |
| Mol Recycle Gas/Mol Hydrocarbon Reactant | 5–20 | 10–15 |
| Mol Hydrogen/Mol Hydrocarbon Reactant | 1.5–19 | 5–12 |
| Hydrogen Content of Recycle Gas, Mol percent | 30–95 | 50–80 |
| Inert Gas addition, Cubic feet/Bbl. naphtha charged | 300–5,000 | 500–2,500 |
| Space Velocity, Volume Hydrocarbon reactant/hr./volume catalyst | 0.5–10 | 1.5–5.0 |

In general, the present method of reforming a hydrocarbon reactant comprises contacting a hydrocarbon reactant at elevated temperatures of about 850°–1080° F. preferably about 960° to about 1060° F. in the presence of a particle form solid reforming catalyst of the first class in the presence of a recycle gas containing hydrogen at operating pressures of about 150 to 600 p. s. i. a., and at hydrogen partial pressures of about 15 to about 80 p. s. i. maintained by admixing sufficient inert fluid with the hydrogen containing gaseous heat carrier, recycle gas, for example, and hydrocarbon reactant to produce the required partial pressure of hydrogen.

The term "inert fluid" includes any one or more or a mixture of two or more of the following methane, ethane, propane, nitrogen or, in general, a material which is a vapor at the reaction temperature and is not chemically reactive under the conditions existing in the reactor.

Since particle-form solid reforming catalysts are numerous and well-known to those skilled in the art, and since the catalyst employed in the reforming conversion is not a part of this invention, it is only necessary to mention that the catalyst presently preferred is a particle form solid reforming catalyst comprising at least about 70 mol percent alumina and about 18 to about 30 mol percent chromia.

A hydrocarbon reactant is a single hydrocarbon or a mixture of hydrocarbons capable of undergoing any one or more or all of the molecular changes: isomerization, hydrogenation, dehydrogenation and dehydrocyclization, or a mixture of such hydrocarbons and hydrocarbons incapable of undergoing such molecular changes and specifically petroleum naphthas. Reforming is that hydrocarbon conversion involving one or more or all of the aforesaid molecular changes, whereby the octane rating of a hydrocarbon reactant, such as a naphtha, is raised. Operating or reactor pressure is the total pressure in pounds per square inch absolute existing at least in the reaction zone. Hydrogen partial pressure is that portion of the total reactor pressure which the mol percent concentration of hydrogen in the reaction zone effluent gases bears to the total reaction zone feed gases.

For the purpose of illustrating the advantages of reforming at high operating or reactor pressure and low partial pressure of hydrogen as compared with reforming at high operating or reactor pressure and high partial pressure of hydrogen, the following data obtained when reforming a virgin Columbian naphtha having a boiling range of 200°–400° F., a Research Clear Octane Number of 42 and a Research Leaded (3 cc. T. E. L./gallon) Octane Number of 60 in the presence of the preferred chromia-alumina catalyst representation of the first class of composites with counter-current flow of catalyst and vapors under the conditions set forth in the following tabulation is presented.

|  | High Operating Pressure—High H₂ Partial Pressure | High Operating Pressure—Low H₂ Partial Pressure | |
|---|---|---|---|
| Case Number | I | II | III |
| Total Reactor Pressure, p. s. i. a. | 260 | 260 | 260 |
| Hydrogen Content of Gaseous Heat Carrier (Recycle Gas), Mol Percent | 42.8 | 32.0 | 26.2 |
| Hydrogen Partial Pressure, Reactor, Inlet, p. s. i. | 101 | 82.5 | 61.5 |
| Cubic Feet of Inert Fluid (gas) added/Bbl. of Naphtha | 0 | 380 | 1,410 |
| Recycle gas, mols/mol naphtha | 6 | 6 | 6 |
| Recycle gas, Mols H₂/mol naphtha | 2.6 | 1.9 | 1.6 |
| Catalyst Inlet Temp., °F | 800 | 800 | 800 |
| Catalyst to naphtha weight ratio | 0.2 | 0.2 | 0.2 |
| Space velocity, v./hr./v. | 1.0 | 1.0 | 1.0 |
| Outlet Vapor Temp., °F | 986 | 967 | 958 |
| Average Reactor Temp., °F | 994 | 982 | 934 |
| Net Gas Yield, Wt. percent | 15.0 | 13.4 | 12.0 |
| Net Gas Yield, Cubic Ft./Bbl. Naphtha | 830 | 850 | 1,010 |
| Hydrogen Produced, Cubic Ft./Bbl. naphtha | 355 | 430 | 630 |
| Reformate Octane Number: Research Clear | 90 | 90 | 90 |
| Research Leaded (3 cc. T. E. L. per gallon) | 98 | 98 | 98 |
| 10 R. V. P. Gasoline Yield, Vol. percent of Charge | 83 | 86 | 88 |

It is to be noted that the increased yield of 10 R. V. P. gasoline represents, for a unit treating 10,000 barrels per day, an increase of about 108,000 to about 180,000 barrels of 98 octane gasoline per year over the operation at high hydrogen partial pressure. Furthermore, by referring to Figure 1, it will be found that a yield of 86 volume percent of 98 Research Octane Number 10 R. V. P. gasoline is normally obtained at 185 p. s. i. a. Thus, the same yield of 10 R. V. P. gasoline having the same octane rating was obtained under the conditions tabulated for Case II operating pressure 260 p. s. i. a. as normally would be obtained with an operating pressure of 185 p. s. i. a. In a similar manner, it can be determined that a yield of 88 volume percent of 10 R. V. P. gasoline having a 98 Research Octane Number will be obtained from this charge naphtha at a total reactor pressure of 115 p. s. i. a. On the other hand, by the method of this invention, a yield of 88 volume percent can be obtained at a total reactor pressure of 260 p. s. i. a. (Case III). Thus, it is manifest that the operating conditions of Cases II and III retain the advantages of operation at high total pressure set forth hereinbefore, while obtaining the advantages of operating at low total pressures.

For the purpose of illustrating the advantage of reforming at high operating pressure and low partial pressure of hydrogen as compared with reforming at high operating or reactor pressure and high partial pressure of hydrogen, the following data obtained when reforming a Mid-Continent naphtha having a boiling range of 230° to 400° F., a Research Clear Octane Number of 35 and a Research Leaded (3 cc. T. E. L./gallon) Octane Number 58 in the presence of a platinum type catalyst representative of the second class of composites under conditions set forth in the following tabulation is presented.

|  | High Operating Pressure—High H₂ Partial Pressure | High Operating Pressure—Low H₂ Partial Pressure | |
|---|---|---|---|
| Case Number | IV | V | VI |
| Total Reactor Pressure, p. s. i. a. | 900 | 900 | 900 |
| Hydrogen Content of Gaseous Heat Carrier (Recycle Gas), Mol. Percent | 80 | 70 | 54 |
| Hydrogen Partial Pressure, Reactor Inlet, p. s. i. | 665 | 580 | 450 |
| Cubic Feet of Inert Fluid (gas) added/Bbl. of Naphtha | 0 | 260 | 680 |
| Recycle Gas, Mols/Mol Naphtha | 10 | 10 | 10 |
| Mols H₂/Mol Naphtha | 8 | 7 | 5.4 |
| Space Velocity, v./hr./v. | 2 | 2 | 2 |
| Average Reactor Temp., °F | 900 | 887 | 872 |
| Reformate Octane Number Research clear | 85 | 85 | 85 |
| Research Leaded (3 cc. TEL/gal.) | 95 | 95 | 95 |
| 10 R. V. P. Gasoline Yield, Vol. Percent of charge | 92.3 | 95.5 | 97.7 |
| Yield Improvement, Vol. Percent Charge |  | 3.2 | 5.4 |

The inventive concept of reforming at high reactor or total or operating pressure and at low hydrogen partial pressures can be put into industrial practice in many ways. Accordingly, for the purpose of illustration, the treatment of a hydrocarbon reactant in a counter-current manner and in a split feed mode of operation employing a moving substantially compact column of particle-form solid reforming catalyst, and operating at high reactor or operating pressure and low hydrogen partial pressure, is presented as exemplary of the application of the principles of the present invention to those reforming methods in which the catalyst is circulated through a reaction zone and a regeneration zone in series, whether the catalyst be in the "fluidized" state or present as a moving bed. The application of the principles of the present invention to reforming in the presence of a bed in place will also be illustrated.

Figure 9:
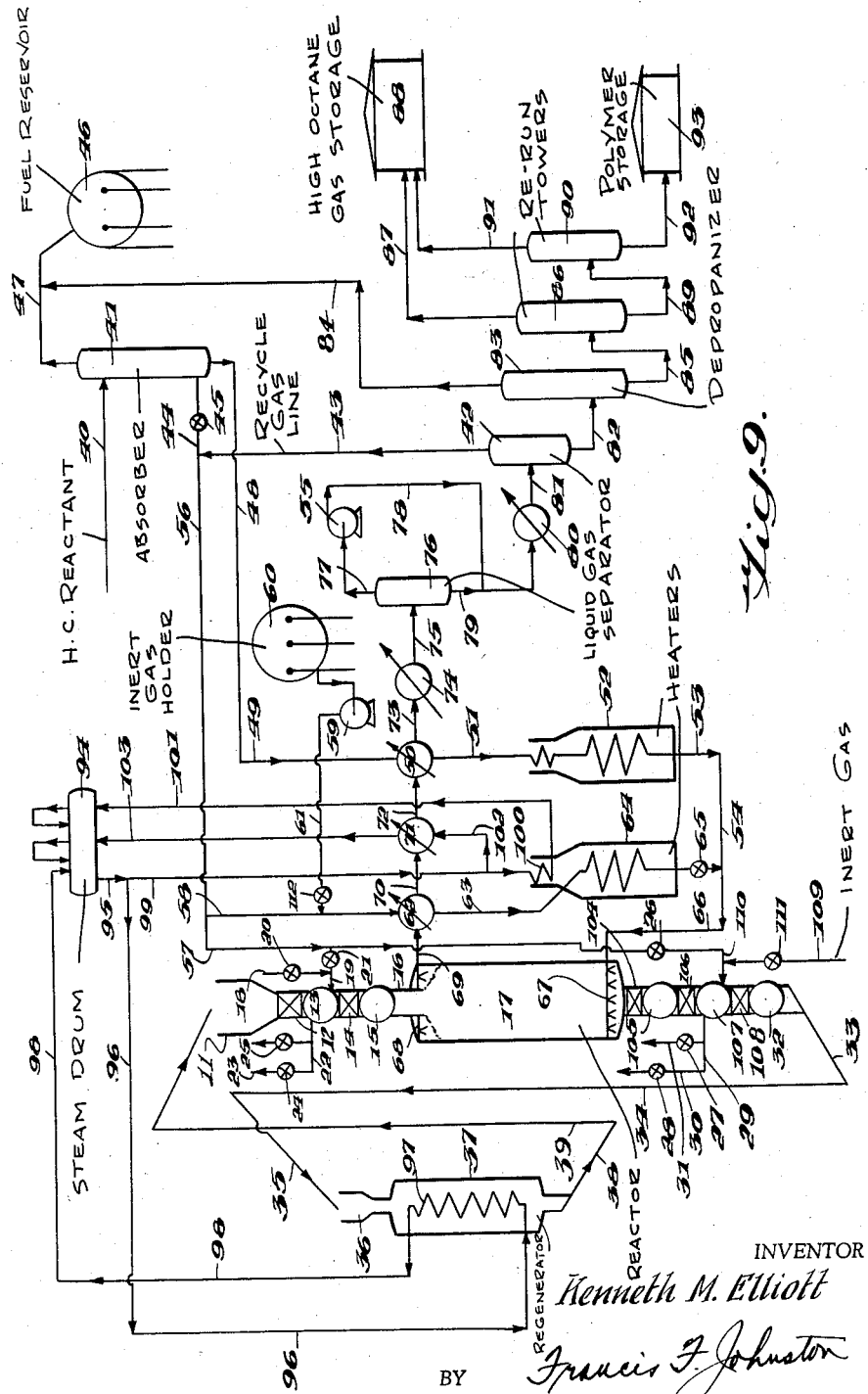
Figure 9 is a schematic flow sheet illustrating a means of reforming a hydrocarbon reactant in the presence of a moving substantially compact column of particle form solid reforming catalyst in accordance with the principles of the present invention.

Referring now to Figure 9; Figure 9 is a schematic flowsheet of a method of reforming hydrocarbon reactant such as a virgin naphtha, a cracked naphtha or a mixture of straight run and cracked naphtha wherein the vapors of the reactant recycle gas and inert gas flows upwardly counter-current to a downwardly moving substantially compact column of particle-form solid reforming catalyst. For ease of description, the course of the catalyst through the reactor and regenerator will be followed and then the path of the vapors and gases will be traced. Thus, active catalyst in bin 11 flows into reactor 17 through any suitable reactor-sealing and particle-form transfer means suitable for transferring particle-form catalyst from a zone of given pressure to a zone of higher pressure. As illustrated, the reactor-sealing and particle form transfer means is a pressure lock comprising gastight valves 12 and 14 and intermediate pressuring pot or vessel 13. The pressure lock operates in a cyclic manner as follows: with gas-tight valve 14 closed and gastight valve 12 open, the catalyst flows from bin or hopper 11 into pressuring chamber 13. Valve 12 is closed and the contents of vessel 13 are purged with an inert and/or nonflammable gas such as flue gas flowing from a source not shown through pipes 18 and 19 under control of valve 20 with valve 21 closed. The purge is vented through pipes 22 and 23 with valve 24 open and valve 25 closed. Valves 20 and 24 are closed and the pressure in chamber 13 is raised to at least that of reactor 17 and preferably about 5 p. s. i. greater by recycle gas flowing under pressure from liquid gas separator 42 through pipes 43, 56, 57, and 19 under control of valve 21. When the pressure in vessel 13 is at least that of reactor 17, valve 21 is closed and valve 14 opened. The catalyst flows into surge bin 15. Valve 14 is closed and pressuring chamber 13 is purged as described hereinbefore, completing the cycle.

The particle-form solid reforming catalyst flows downwardly from surge bin 15 through conduit 16 to reactor 17 and therethrough as a substantially compact column. During passage through reactor 17, in contact with the gases therein, the catalyst becomes partially deactivated by the deposition thereon of a carbonaceous deposit generally termed coke. The partially deactivated catalyst flows out of reactor 17 through a catalyst flow control means 104, which can be of any suitable type such as a throttle valve into a surge chamber 105. From surge chamber 105 the catalyst passes through any suitable reactor-sealing and particle form solid transfer means such as the depressure lock comprising gas-tight valves 106 and 108 and intermediate depressuring chamber or vessel 107.

The depressuring lock operates in a cyclic manner similar to that of the pressuring lock. Thus, with gas-tight valves 106 and 108 closed, depressuring chamber 107 is purged with an inert and/or non-flammable gas such as flue gas flowing from a source not shown through pipes 109 and 110 with valves 111 open and valves 26 and 27 closed. The purge is vented through pipes 29 and 30 under control of valve 28. Valves 111 and 28 are closed and the pressure in depressuring chamber 107 is raised to that of reactor 17 by introducing thereinto a pressuring gas such as recycle gas flowing under pressure from gas-liquid separator 42, through pipes 43, 56, 57 and 110 with valve 26 open and valves 111, 27 and 28 closed. When the pressure in chamber 107 is about that of reactor 17, valve 106 is opened, valve 26 closed and the catalyst flows from surge chamber 105 into depressuring chamber 107. Valve 106 is closed and the gaseous contents of chamber 107 vented through pipes 29 and 31 under control of valve 27. When the pressure in chamber 107 reaches that of kiln or regenerator 37, valve 27 is closed and valve 111 opened and chamber 107 is purged with an inert and/or non-flammable gas such as flue gas. The purge is vented through pipes 29 and 30 under control of valve 28, completing the cycle.

After purging chamber 107, valve 108 is opened and the catalyst flows into surge chamber 32. From surge chamber 32, the partially deactivated catalyst flows to chute 33 and thence to any suitable catalyst transfer means such as a gas-lift, elevator or the like 34, whereby the catalyst is transferred to kiln or regenerator 37.

Those skilled in the art will understand that when the partially deactivated catalyst is regenerated at pressures approaching that of the reactor, the reactor-sealing and particle-form solid transfer means is not required.

The partially deactivated catalyst is transferred by catalyst transfer means to chute 35 along which it flows to kiln feed hopper or chamber 36. From hopper 36, the catalyst flows into kiln 37 which can be of any suitable type, wherein the coke is burned in a stream of combustion-supporting gas such as air. The catalyst flows downwardly through kiln or regenerator 37 and thence to chute 38, along which it flows to any suitable catalyst transfer means 39 such as a gas-lift elevator or the like. In Figure 9, catalyst transfer means 34 and 39 are illustrated as elevators. Catalyst transfer means 39 transfers the activated catalyst to reactor feed hopper 11, completing the catalyst cycle.

The hydrocarbon reactant is pumped under at least reactor pressure from a source not shown through line 40 to absorber 41. In absorber 41 the hydrocarbon reactant flows downwardly in contact with an upwardly flowing portion of the gases flowing from liquid-gas separator 42 through pipes 43 and 44 under control of valve 45. The portion of gas flowing through absorber 41 generally represents the reactor "make" gas. The gas after contacting the charge stock in absorber 41, flows to refinery fuel reservoir 46 through pipe 47.

The charge stock strips light gasoline from the gas passing through absorber 41 and flows therefrom through lines 48 and 49 to heat exchanger 50 and thence through line 51 to heater 52. The heated charge stock flows from heater 52 through line 53 to charge mixture line 54.

Recycle gas flows from liquid-gas separator 42 under at least reactor pressure impressed by pump 55 through pipes 43 and 56 to pipe 58.

Inert gas is pumped under at least reactor pressure by pump 59 from holder 60 through pipe 61 to pipe 58 under control of valve 112; where it is mixed with recycle gas in pipe 58 in amount sufficient to provide a recycle gas containing only about 20 percent to about 75 percent hydrogen.

The mixture of hydrogen-containing recycle gas and inert gas flows through pipe 58 to heat exchanger 62, thence through pipe 63 to heater 64, and from heater 64 to charge mixture line 54 under control of valve 65.

The recycle gas is mixed with the charge stock in the mol ratio of about 1 to about 15:1 and preferably in the mol ratio of about 4 to 10:1, or in the mol ratio of about 1 to about 8, preferably about 2 to about 5 mols hydrogen per mol of naphtha. Since the temperature at the vapor inlet of the reaction zone is about 900° to about 1080° F., preferably about 1000° to about 1060° F. for group VI type catalyst, the components of the charge mixture, i. e., recycle and inert gases and charge stock are heated to individual temperatures such that when mixed to form the charge mixture, has a temperature of about 900° to about 1080° F. It is generally preferred to heat the charge stock to about 900° to about 1080° F. and the recycle-inert gas mixture to about 1000° to about 1100° F.

The charge mixture in line 54 flows therefrom through line 66 to distributor 67 in reactor 17. Distributor 67 is of any suitable type whereby the charge mixture is distributed over the cross-section of reactor 17. The vapors of charge mixture flow upwardly from distributor 67 counter-current to the downwardly flowing substantially compact column of particle-form solid reforming catalyst to flow through collector 68 to line 69. The reactor effluent flows through line 69 to heat exchanger 62, line 70, heat exchanger 71, line 72, heat exchanger 50 and line 73 to condenser 74. From condenser 74, the reactor effluent flows through line 75 to liquid gas separator 76.

In liquid gas separator 76, the uncondensed portion of the reactor effluent passes as overhead through pipe 77 to pump 55 where it is pressured to at least reactor pressure and discharged through pipe 78.

The condensed portion of the reactor effluent flows from liquid gas separator 76 through line 79 where the uncondensed portion of the reactor effluent in pipe 78 is mixed therewith. The mixture of uncondensed and condensed effluent under the pressure impressed by pump 55 flows to cooler 80 and thence through line 81 to liquid gas separator 42.

In liquid gas separator 42 the uncondensed portion of the reactor effluent including the inert gas introduced into the reactor flows overhead through pipe 43 to pipe 56 where, when desirable, a portion about equivalent to the "make" gas and the added inert gas is bled off through pipe 44 under control of valve 45 to absorber 41. The balance of the uncondensed reactor effluent flows through pipe 56 as recycle gas.

The condensed effluent flows from liquid-gas separator 42 through line 82 to depropanizer 83 where an overhead fraction is taken through pipe 84 to pipe 47 and the refinery fuel sphere 46.

The bottoms of depropanizer 83 flow through line 85 to primary re-run tower 86 where a gasoline of improved octane rating is taken overhead through line 87 to gasoline storage 88.

The bottoms of primary re-run tower 86 flow through line 89 to secondary re-run tower 90 where a gasoline of improved octane-rating is taken overhead through line 91 to gasoline storage 88.

The bottoms from secondary re-run tower 90 flow through line 92 to polymer storage 93.

In order to obtain better overall heat balance, a heat exchange medium such as steam is circulated from steam drum 94 through pipes 95 and 96 to coil 97 in kiln or regenerator 37 and pipe 98 to drum 94. Steam from drum 94 also flows through pipes 95 and 99 to coil 100 in gas heater 64 and pipe 101 to drum 94. A portion of the steam in pipe 99 is bled off through pipe 102 and passed through heat exchanger 71 and pipe 103 to drum 94.

Since reactor 17 of Figure 9 can be replaced by reactor 217 of Figure 10, it is believed unnecessary to repeat the description of the method of introducing catalyst into reactor 17, withdrawing catalyst from reactor 17, transferring catalyst from reactor 17 to kiln 37 and the return of catalyst to reactor 17 when describing that embodiment of the present invention illustrated in Figure 10. It will suffice to state that catalyst flows downwardly through conduit 216 into reactor 217 and flows downwardly through reactor 217 as a substantially compact column of particle form solid reforming catalyst. The partially deactivated catalyst flows from reactor 217 through catalyst flow control means 218 to a reactor-sealing and catalyst transfer means of any suitable type such as illustrated in Figure 9.

Reactor 217 as illustrated is piped for concurrent flow of reactant and catalyst and for split-feed flow in which a portion of the reactant flows upwardly counter-current to the downwardly flowing substantially compact column of particle form solid reforming catalyst and the balance flows downwardly concurrent with the downwardly flowing substantially compact column of particle form solid reforming catalyst. Concurrent flow of the charge mixture will be described first and split-feed flow thereafter.

Hydrocarbon reactant such as a naphtha is pumped under at least reactor pressure from a source not shown by a pump not shown through line 220 to coil 221 of heater 222. The heated naphtha or charge stock flows from heater 222 through line 223 to charge mixture line 224.

Recycle gas is drawn from a source not shown through pipe 225 by pump 226 and pumped under at least reactor pressure through pipe 227 to coil 228 of heater 229. The heated recycle gas flows from heater 229 through pipe 230 under control of valve 231 to charge mixture line 224.

Inert gas is drawn from a source not shown through pipe 232 by pump 233 and pumped under at least reactor pressure through pipe 234, coil 235 in heater 229. The heated inert gas flows from heater 229 through pipe 236 under control of valve 237 to heated recycle gas pipe 230 and mixed therein with the heated recycle gas in an amount sufficient to provide a recycle gas containing about 20 to 75 percent hydrogen.

The recycle gas is mixed with the charge stock in the ratio of about 1 to 15, preferably about 4 to about 10 mols of recycle gas per mol of charge stock or in the ratio of about 1 to about 8, preferably about 2 to about 5 mols of hydrogen per mol of charge stock.

The charge stock is heated to reaction temperature and preferably not higher than about 1080° F. The recycle gas and inert gas are heated to temperatures such that, when mixed with the charge stock in the aforesaid amounts, the charge mixture has a temperature of about 900° to about 1080° F. preferably about 1000° to about 1060° F.

When the catalyst employed contains moisture or compounds which react with the hydrocarbon reactant to produce water, it is advantageous to add carbon monoxide to the contents of the reaction zone as described in the co-pending application for United States Letters Patent Serial No. 333,901, filed January 29, 1953, now Patent No. 2,756,190, granted July 24, 1956. One means of introducing carbon monoxide into the reaction zone or reactor is through pipe 267 under control of valve 268 into recycle gas pipe 232. Such carbon monoxide is not an inert gas since about 0.5 to about 1 cubic foot of carbon monoxide is consumed per pound of catalyst introduced into the reactor.

The heated charge mixture formed in line 224 by the addition of heated recycle gas and heated inert gas or heated recycle gas, heated inert gas and carbon monoxide to the heated charge stock in the proportions set forth hereinbefore flows along lines 224 and 239 under control of valve 240 to line 241 and distributor 242 of any suitable type, whereby the charge mixture is distributed across the cross-section of reactor 217. With throttling means 243 closed, the vapors of the charge mixture flow downwardly concurrently with the downwardly flowing substantially compact column of particle-form solid reforming catalyst. During contact with the moving bed of catalyst, the hydrocarbons of the charge stock are at least in part reformed and the catalyst partially deactivated by the deposition thereon of coke. The reformed charge stock, inert gas, recycle gas and "make" gas form the reactor effluent which flows from reactor 217 through collector 244 and line 245 under control of throttling means 246, which can be of any suitable type such as a throttle valve, to line 247 and thence to line 248.

The effluent flows along line 248 to heat exchangers, condensers, gas-liquid separators and the like to fractionators and storage such as illustrated in Figure 9.

When reactor 217 is to be used with a split-flow feed valve 240 is closed and the parts of branches 249 and 250; 251 and 252; 253 and 254; 255 and 256; with respectively associated pairs of distributors 257 and 258; 259 and 260; 261 and 262; 263 and 264 are employed. Each of the pairs of distributors 257 and 258; 259 and 260; 261 and 262; 263 and 264: divide the moving bed of catalyst into two catalyst beds. Thus, when using distributors 257 and 258, the catalyst bed formed between distributor 257 and collector 265 is 20 percent of the total volume of the reactor volume, while the catalyst bed formed between distributor 258 and collector 244 is 80 percent of the total reactor volume. Similarly, the bed formed between distributor 261 and collector 265 is 60 percent of the total reactor volume while the bed formed between distributor 262 and collector 244 is 40 percent of the total reactor volume.

The portion of the charge mixture flowing upwardly from any one of distributors 257, 259, 261 and 263 to collector 265 and the complementary portion flowing downwardly from one of the distributors 258, 260, 262 and 264 to collector 244 and the space velocities in the two beds formed as described hereinbefore is controlled by throttling means 243 and 246 as described in the copending application Serial No. 285,481, filed May 1, 1952, in the name of Kenneth M. Elliott, now Patent No. 2,738,308, granted March 13, 1956, to produce reformates of substantially equal octane rating in both reforming zones.

Thus, for the purpose of illustration, the charge mixture is introduced into reactor through distributors 259 and 260. The charge stock is drawn from a source not shown and pumped by a pump not shown through line 220 to coil 221 in heater 222, where the charge stock is heated to a reaction temperature preferably not higher than about 1080° F. The heated charge stock flows along line 223 to charge mixture line 224.

Recycle gas is drawn from a source not shown through pipe 225 by pump 226 and discharged under at least reactor pressure through line 227 to coil 228 of heater 229. In coil 228 the recycle gas is heated to a temperature such that when mixed with heated charge stock in line 224 in the ratio of about 1 to about 15, preferably about 4 to about 10 mols of recycle gas per mol of charge stock or about 1 to about 8, preferably about 2 to about 5 mols of hydrogen per mol of charge stock and heated inert gas admixed therewith in amount sufficient to provide a hydrogen partial pressure of about 15 to about 200, preferably about 25 to about 60 p. s. i., the charge mixture thus formed has a temperature of about 850° to about 1080° F. preferably about 960° to about 1060° F.

The heated recycle gas flows from coil 228 through pipe 230 under control of valve 231 to charge mixture line 224.

Inert gas is drawn from a source not shown through line 232 and pumped by pump 233 under at least reactor pressure through pipe 234 to coil 235 in heater 229. The inert gas is heated in coil 235 to an elevated temperature of about the same order of magnitude as that of the recycle gas or somewhat in excess thereto, preferably about 1000 to about 1200° F. The heated inert gas flows from coil 235 through pipe 236 under control of valve 237 to heated recycle gas pipe 230. Therein the heated inert gas is mixed with the heated recycle gas in amount sufficient to provide a recycle gas containing about 20 to about 75 percent hydrogen. The charge mixture thus formed flows along line 224 to line 239 and thence to lines 251 and 252 and distributors 259 and 260 under control of valves 271 and 272.

That portion of the charge mixture entering reactor 217 through distributor 259 flows upwardly countercurrent to the downwardly flowing substantially compact column of particle-form solid reforming catalyst. The effluent comprising reformed charge stock, recycle gas, "make" gas and inert gas flows from reactor 217 through collector 265 and line 266 under control of throttling means 243, for example, a throttle valve to line 248.

That portion of the charge mixture entering reactor 217 through distributor 260 flows downwardly concurrently with the downwardly flowing substantially compact column of particle form solid reforming catalyst. The effluent flows from reactor 217 through collector 244 and line 245 under control of throttling means 246, for example, a throttle valve, to line 247 and thence to line 248 where the two effluents containing reformate of substantially the same octane rating mix. The mixed effluents in line 248 flow to heat exchangers, condensers, gas-liquid separators, etc., as illustrated in Figure 9.

When two different charge stocks are to be treated simultaneously in reactor 217, a second coil in heater 222 is used or a second heater 277 is provided.

Thus, a second charge stock different from the first charge stock heated in coil 221 of heater 222 is drawn from a source not shown and pumped under at least reactor pressure through line 278 to coil 279 in furnace 277. The charge stock is heated in coil 279 to a reaction temperature preferably not greater than about 1080° F. flows through line 280 to charge mixture line 281.

Recycle gas and inert gas heated as aforesaid in coils 228 and 235 respectively in heater 229 flow from pipe 230 under control of valve 282 through pipe 283 to charge mixture line 281. The recycle gas, inert gas and charge stock are mixed in the proportions set forth hereinbefore to form a second charge mixture having a temperature of about 850° to about 1080° F. preferably about 960° to about 1060° F.

The second charge mixture flows along line 281 to manifold 284 having valve 288 provided with branches 285, 286, 287 having valves 289, 290 and 291. The second charge mixture can be introduced into reactor 217 through distributor 258 under control of valve 288; distributor 260 under control of valve 289; distributor 262 under control of valve 290; or distributor 264 under control of valve 291.

Thus, the first charge mixture flows from line 239 through line 253 under control of valve 273 to distributor 261. The first charge mixture flows upwardly from distributor 261 and the reformate, recycle gas, "make" gas and inert gas flow to collector 265 and thence under control of throttling means 243 to effluent lines 266 and 248.

The second charge mixture flows from manifold 284 to branch 286 and thence under control of valve 290 to distributor 262. The second charge mixture flows downwardly from distributor 262 and the reformate produced together with recycle gas, "make" gas and inert gas flows through collector 244 to lines 245, 247 and 248 under control of throttling means 246.

The mixed effluent of substantially the same octane rating flow along line 248 to heat exchangers, etc., as illustrated in Figure 9.

The principles of the present invention can be applied to reforming a charge stock in the presence of a bed in place comprising particle form solid regeneratable reforming catalyst in the manner schematically illustrated in Figure 11. (At present it is considered unnecessary to regenerate platinum type catalysts.)

Thus, three reactors 300, 400 and 500 are provided. The catalyst in reactor 500 is being regenerated and reactor 400 is on stream. Accordingly, a charge stock for example, a virgin naphtha, or a cracked naphtha or a mixture of virgin and cracked naphtha is drawn from a source not shown and pumped under at least reactor pressure by a pump not shown through line 301 to coil 302, in furnace 303 where it is heated to a reaction temperature preferably not greater than about 1080° F. The heated charge stock flows from coil 302 through line 304 to charge mixture line 305.

Recycle gas drawn from a source not shown through pipe 306 and pumped through pipe 307 by pump 308, under at least reactor pressure, is heated in coil 309 in heater 310. The recycle gas is heated to at least a reaction temperature such that when mixed with charge stock in the ratio set forth hereinbefore and with an amount of inert gas sufficient to provide a hydrogen partial pressure of about 15 to about 200, preferably about 25 to 60 p. s. i., at a total reactor or operating pressure of about 25 to about 600, preferably about 100 to about 300 p. s. i. a. to form a reaction mixture, the reaction mixture has a temperature of about 850° to about 1080° F., preferably about 960° to about 1060° F.

The heated recycle gas flows from coil 309 through pipe 311 to charge mixture line 305 where it is mixed with heated charge stock to form heated charge mixture.

The heated charge mixture flows along charge mixture line 305 to manifold 312 and with valve 313 closed, flows to line 314. From line 314 with valve 315 closed and valve 316 open, the charge mixture flows along line 317 to distributor 318.

Inert gas drawn from a source not shown through pipe 319 is pumped under at least reactor pressure by pump 320 through line 321 to coil 322 in heater 310. In coil 322, the inert gas is heated to at least a reaction temperature. The heated inert gas flows from coil 322 through pipe 323 to manifold 324 and thence under control of valve 325 through manifold branch 326 to charge mixture line 317 where it mixes with the charge mixture in a ratio to provide the required hydrogen partial pressure.

The charge mixture rises through the in situ bed of particle-form solid reform catalyst in reactor 400 and thereby is reformed to yield a reactor effluent which flows through collector 401 and lines 402 and 403, under control of valve 404 to common transfer line 405. The effluent flows along transfer line 405 to heat exchangers, etc., to fractionators and storage such as illustrated in Figure 9.

Since the catalyst in reactor 300 is active, the reactor is ready to be purged and put on stream. Accordingly, reactor 300 is purged with an inert and non-flammable gas such as flue gas drawn from a source not shown through pipe 327 under control of valve 328 and flowing through line 329 with valve 330 closed. The purge gas flows upwardly through reactor 300 and is vented through pipes 331 and 332 under control of valve 333. Valves 328 and 333 are closed and pressuring gas such as recycle gas is pumped into reactor 300 from a source not shown under about 25 to 600 p. s. i. a. by pump 308 through pipes 307, 334 and 329 with valve 330 open and valve 335 in pipe 336 and valve 337 in line 338 closed. When the pressure in reactor 300 is that at which the conversion is to take place, valve 330 is closed and the reactor is ready to be put on stream.

Heated charge mixture flows from charge mixture line 312 through line 314 to line 339 under control of valve 315. Heated inert gas flows from manifold 324 to branch 340 under control of valve 341 and mixes with charge mixture in line 339, in an amount sufficient to provide a hydrogen partial pressure of about 15 to about 200, preferably about 25 to about 60 p. s. i. at an operating pressure or total reactor pressure of about 25 to about 600, preferably about 100 to about 300 p. s. i. a.

The heated mixture of charge stock, recycle gas and inert gas at a temperature of about 850° to about 1080° F., preferably about 960° to about 1060° F. flows from line 339 to distributor 342 and thence upwardly through the bed of catalyst. The vapors of reformate, recycle gas, "make" gas and inert gas, i. e., reactor effluent, flows to collector 343 and thence through line 338 under control of valve 337 to common transfer line 405 and thence to heat exchangers, condensers, liquid-gas separators, etc., such as illustrated in Figure 9.

When reactor 300 is put on stream, the catalyst in reactor 400 is ready to be regenerated. The catalyst in reactor 400 is regenerated by purging the reactor with an inert and/or non-flammable gas such as flue gas flowing from a source not shown through line 344 under control of valve 345 to line 346 and thence into reactor 400. The purge is vented through lines 347 and 348 under control of valve 349. After purging, reactor 400, the catalyst is reactivated by combustion of the deactivating coke deposited thereon during contact with the charge mixture in a stream of combustion-supporting gas, such as air, drawn from a source not shown through pipes 349a, 344 and 346 under control of valve 350. The products of combustion of the coke are vented through pipes 347 and 351 under control of valve 352. After regeneration, the reactor 400 is purged as described hereinbefore and pressured to about 25 to about 600, preferably about 100 to about 300 p. s. i. a. with any suitable gas such as recycle gas pumped into reactor 400 by pump 308 via pipes 307, 334, 352 and 346. The reactor is then ready to be placed on stream again.

When reactor 400 is on stream and reactor 300 is ready to be placed on stream, the catalyst in reactor 500 is being regenerated. That is to say, reactor 500 having been purged with an inert and/or non-flammable gas such as flue gas drawn from a source not shown through pipes 353 and 355 under control of valve 354 and the purge vented through pipes 356 and 357 under control of valve 358 is ready to be pressured with a suitable gas such as recycle gas pumped from a source not shown by pump 308 through pipes 307, 334, 352 and 355, under control of valve 359. Accordingly, valve 358 in pipe 357 and valve 360 in pipe 361 are closed and reactor 500 pressurized to about 25 to about 600, preferably about 100 to about 300 p. s. i. a.

Heated charge mixture in charge mixture line 305 flows under at least reactor pressure into manifold 312 with valve 313 open and thence to line 362 through which the charge mixture flows to distributor 363. Inert gas in amount sufficient to provide a hydrogen partial pressure of about 15 to about 200, preferably about 25 to about 60 p. s. i., at a total reactor pressure or operating pressure of about 25 to about 600, preferably about 100 to about 300 p. s. i. a., flows from pipe 323 to inert gas manifold 324 and under control of valve 364 to charge mixture lines 312 and 362 and distributor 363.

The charge mixture flows upwardly through the fixed catalyst bed in reactor 500 undergoing conversion during passage. The reformed charge stock, recycle gas, "make" gas and inert gas flows from reactor 500 through collector 365, lines 366 and 403 under control of valve 367 to reactor-effluent transfer line 405 and thence to heat exchangers, etc., such as illustrated in Figure 9.

When the catalyst in reactor 300 is to be regenerated by combustion of the coke deposited thereon during the on-stream period, combustion supporting gas is pumped from a source not shown through pipes 368, 327 and 329 under control of valve 369. Similarly, when the catalyst in reactor 500 is regenerated, combustion supporting gas is pumped from a source not shown through pipes 407, 353 and 355 under control of valve 406 with valve 354 closed.

From the foregoing description of the present invention, it is manifest that in contrast to prior art practice in which low hydrogen partial pressures were employed with concomitant low total reactor or operating pressures, the present invention provides for the reforming of a hydrocarbon reactant over a catalyst of the group VI type in the presence of a recycle gas in the mol ratio of about 1 to about 8 mols, preferably about 2 to about 5 mols of hydrogen, or about 1 to about 15 mols, preferably about 4 to about 10 mols of recycle gas per mol of hydrocarbon reactant at a total reactor or operating pressure of about 40 to about 600, preferably about 100 to about 300 p. s. i. a. and a hydrogen partial pressure of about 15 to about 80, preferably about 25 to about 60 p. s. i. Preferably the hydrogen partial pressure is produced and maintained by the introduction into the reaction zone of sufficient inert gas, say about 300 to about 5000, preferably about 500 to about 2500 cubic feet of inert gas per barrel of hydrocarbon reactant charged, dependent upon the hydrogen concentration of the reactor effluent to provide the aforesaid hydrogen partial pressure in the reaction zone at said total reactor or operating pressure. Space velocities of about 0.1 to about 4.0 and preferably about 0.5 to about 2.0 are maintained. It is preferred to use a recycle gas containing about 10 to about 45, preferably about 20 to about 30 mol percent hydrogen balance $C_1$ to $C_6$ hydrocarbons.

The present invention also provides for the reforming of hydrocarbon reactant over a catalyst of the group VIII type, in the presence of recycle gas in the mol ratio of about 1.5 to about 19 mols, preferably about 5 to about 12 mols of hydrogen; or about 5 to 20 mols, preferably about 10 to about 15 mols of recycle gas per mol of hydrocarbon reactant at a total reactor or operating pressure of about 200 to about 1200, preferably about 300 to about 1000 p. s. i. a. and a hydrogen partial pressure of about 150 to about 650, preferably about 200 to about 500 p. s. i. a. Preferably, the hydrogen partial pressure is produced and maintained by the introduction into the reaction zone of sufficient inert gas, say about 300 to about 5000, preferably 500 to about 2500 cubic feet of inert gas per barrel of hydrocarbon reactant charged, depending upon the hydrogen concentration of the reactor effluent to provide the aforesaid hydrogen partial pressure in the reaction zone at said total reactor or operating pressure. Space velocities of about 0.5 to about 10.0 and preferably about 1.5 to about 5.0 are maintained. It is preferred to use a recycle gas containing about 30 to about 95, preferably about 50 to about 80 mol percent hydrogen, balance $C_1$ to $C_6$ hydrocarbons.

I claim:

1. In the reforming of hydrocarbons which comprises contacting a hydrocarbon reactant to be reformed in a reforming zone with a particle-form solid reforming catalyst selected from the class consisting of (a) an oxide of at least one metal in the left column of group VI of the periodic table and at least one of alumina and silica and (b) at least one metal of the platinum group and at least one of alumina and silica, in the presence of hydrogen under reforming conditions of temperature and pressure, said reforming pressure being, in the absence of the introduction of inert fluid as hereinafter defined, a total reforming zone pressure and a hydrogen partial pressure otherwise conventional for the particular reforming catalyst employed, in order to produce a reforming zone effluent comprising hydrogen and $C_1+$ hydrocarbons, separating a recycle gas comprising hydrogen and $C_1$ to $C_4$ hydrocarbons from $C_5+$ hydrocarbons, recycling at least a portion of said hydrogen-containing recycle gas to said reforming zone, and recovering reformed hydrocarbon reactant from said separated $C_5+$ hydrocarbons, the improvement which comprises maintaining a substantially elevated total reforming zone pressure and introducing into said reforming zone a fluid inert under said reforming conditions in amount sufficient substantially to reduce the hydrogen partial pressure in said reforming zone.

2. A method of reforming a hydrocarbon reactant which comprises introducing particle-form solid reforming catalyst of the second class comprising at least one metal of the platinum group and at least one of alumina and silica into a reforming zone under a total reforming zone pressure of about 200 to about 1200 p. s. i. a. and a hydrogen partial pressure greater than about 150 to about 650 p. s. i. and maintained at a temperature of about 800° to about 1050° F., introducing a hydrocarbon reactant into said reforming zone, introducing a recycle gas containing about 10 to about 75 mol percent hydrogen into said reforming zone to provide a hydrogen partial pressure greater than about 150 to about 650 p. s. i., and introducing a fluid inert under reforming conditions existing in said reforming zone into said reforming zone in amount sufficient to reduce the aforesaid hydrogen partial pressure therein to not greater than about 150 to about 650 p. s. i.

3. A method of reforming a hydrocarbon reactant which comprises introducing particle-form solid reforming catalyst of the first class comprising an oxide of at least one metal in the left column of groups VI of the periodic table and at least one of alumina and silica into a reforming zone under a total reforming zone pressure of about 150 to about 600 p. s. i. a. and maintained at a temperature of about 850° to about 1080° F., introducing a hydrocarbon reactant into said reforming zone, introducing a recycle gas containing about 10 to about 75 mol percent hydrogen into said reforming zone to provide a hydrogen partial pressure greater than about 15 to 80 p. s. i., and introducing a fluid inert under reforming conditions existing in said reforming zone into said reforming zone in amount sufficient to reduce the aforesaid hydrogen partial pressure therein to not greater than about 80 p. s. i.

4. In the reforming of naphtha which comprises subjecting a naphtha in a reforming zone to reforming temperature within the range of about 850° to about 1080° F. in the presence of hydrogen and a particle-form solid reforming catalyst of the first class comprising at least 70 mol percent alumina and at least 18 mol percent chromia at a total reforming zone pressure within the range of about 150 to about 600 p. s. i. a. and hydrogen partial pressures greater than 15 to 80 p. s. i., and recovering reformed naphtha, the improvement which comprises introducing into said reforming zone a fluid inert under the aforesaid reforming conditions in amount sufficient to reduce the aforesaid hydrogen partial pressure therein to about 15 to about 80 p. s. i.

5. In the reforming of naphtha which comprises subjecting a naphtha in a reforming zone to a reforming temperature within the range of about 800° to about 1050° F. in the presence of a particle-form solid reforming catalyst of the second class comprising at least one metal of the platinum group and at least one of the group consisting of silica and alumina at a total reforming zone pressure within the range of about 200 to about 1200 p. s. i. a. and a hydrogen partial pressure greater than 150 to 650 p. s. i. and recovering reformed naphtha, the improvement which comprises introducing a fluid inert under said reforming conditions in amount sufficient to reduce the aforesaid hydrogen partial pressure therein to about 150 to about 650 p. s. i.

References Cited in the file of this patent

UNITED STATES PATENTS

| | | |
|---|---|---|
| 2,250,416 | Burk | July 22, 1941 |
| 2,338,573 | Creelman | Jan. 4, 1944 |
| 2,349,045 | Layng et al. | May 16, 1944 |
| 2,479,110 | Haensel | Aug. 16, 1949 |
| 2,485,073 | Shiffler et al. | Oct. 18, 1949 |
| 2,550,531 | Ciapetta | Apr. 24, 1951 |
| 2,602,771 | Munday et al. | July 8, 1952 |
| 2,606,862 | Keith | Aug. 12, 1952 |
| 2,668,142 | Strecker et al. | Feb. 2, 1954 |
| 2,724,683 | Nadro | Nov. 22, 1955 |